(12) United States Patent
Lovshin et al.

(10) Patent No.: US 10,766,369 B1
(45) Date of Patent: *Sep. 8, 2020

(54) SYSTEMS AND METHODS FOR COLLECTING, STORING, AND USING ELECTRICAL ENERGY FROM THE EARTH MAGNETIC FIELD

(71) Applicants: Albert James Lovshin, Butte, MT (US); Neal Rogers, Butte, MT (US)

(72) Inventors: Albert James Lovshin, Butte, MT (US); Neal Rogers, Butte, MT (US)

(*) Notice: Subject to any disclaimer, the term of this patent is extended or adjusted under 35 U.S.C. 154(b) by 11 days.

This patent is subject to a terminal disclaimer.

(21) Appl. No.: 16/179,797

(22) Filed: Nov. 2, 2018

Related U.S. Application Data

(63) Continuation-in-part of application No. 15/457,947, filed on Mar. 13, 2017, now Pat. No. 10,148,163, which is a continuation-in-part of application No. 14/802,987, filed on Jul. 17, 2015, now abandoned.

(60) Provisional application No. 61/999,191, filed on Jul. 17, 2014, provisional application No. 62/070,211, filed on Aug. 19, 2014.

(51) Int. Cl.
| | |
|---|---|
| *B60L 8/00* | (2006.01) |
| *H02J 7/34* | (2006.01) |
| *B60L 50/40* | (2019.01) |
| *B60L 50/90* | (2019.01) |

(52) U.S. Cl.
CPC ............... *B60L 8/00* (2013.01); *B60L 50/40* (2019.02); *H02J 7/345* (2013.01); *B60L 50/90* (2019.02)

(58) Field of Classification Search
CPC ...... B60L 11/00; B60L 11/002; B60L 11/005; B60L 11/04; H02K 47/00; H02K 3/28; H02K 53/00; Y10S 74/09
See application file for complete search history.

(56) References Cited

U.S. PATENT DOCUMENTS

| | | |
|---|---|---|
| 4,153,757 A | 5/1979 | Clark, III |
| 6,879,888 B2 | 4/2005 | Ochiai |
| 7,468,562 B1 | 12/2008 | Barbic |

(Continued)

OTHER PUBLICATIONS

Zhao, et al., Iodine doped carbon nanotube cables exceeding specific electrical conductivity of metals, Scientific Reports, Sep. 6, 2011, 1-15.

(Continued)

*Primary Examiner* — Sean Gugger
(74) *Attorney, Agent, or Firm* — Cionca IP Law P.C.; Marin Cionca

(57) ABSTRACT

A system for using the Earth's magnetic field to provide supplemental power to a machine having a motor, the system comprising: a computer; wires; and energy storing devices all in controlled electrical communication with each other; wherein the wires can collect electrical energy from the Earth's magnetic field while the machine is put in motion by a power source powering the motor; wherein the collected electrical energy is stored in the energy storing devices or used to power the motor; and wherein each wire from the wires is folded and placed radially in a cylinder, to extend across a diameter of the cylinder, to achieve a maximum length for each of the wires, a maximum total length of the plurality of wires, and such that at least a wire has a correct position relative to the Earth's magnetic field lines of flux at any given time.

7 Claims, 9 Drawing Sheets

(56) References Cited

U.S. PATENT DOCUMENTS

| | | | |
|---|---|---|---|
| 8,098,040 B1* | 1/2012 | Botto | B60L 8/006 |
| | | | 290/44 |
| 2006/0163971 A1 | 7/2006 | Gunderson | |
| 2011/0084503 A1* | 4/2011 | Li | B60G 17/019 |
| | | | 290/1 R |
| 2012/0080888 A1* | 4/2012 | Barbat | H02K 53/00 |
| | | | 290/1 R |
| 2012/0098272 A1 | 4/2012 | Raghuprasad | |
| 2014/0285047 A1* | 9/2014 | McCrady | H02K 3/04 |
| | | | 310/154.01 |
| 2015/0280540 A1 | 10/2015 | McCrady | |
| 2015/0311775 A1 | 10/2015 | Singh | |
| 2015/0360571 A1 | 12/2015 | McCrady | |
| 2016/0197543 A1 | 7/2016 | Purvis | |

OTHER PUBLICATIONS

"Can Carbon Nanotubes Replace Copper?", Sprovieri, John. Assembly Magazine, Jan. 5, 2016, retrieved Aug. 3, 2017.

* cited by examiner

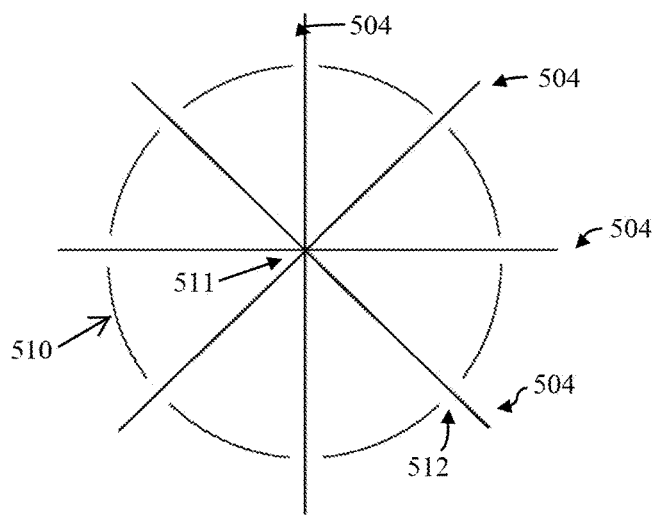
FIG. 5a
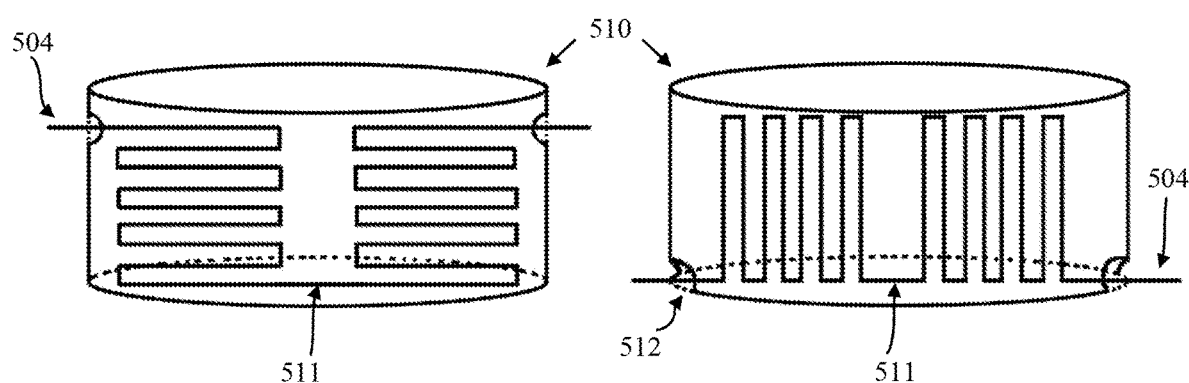
FIG. 5b  FIG. 5c

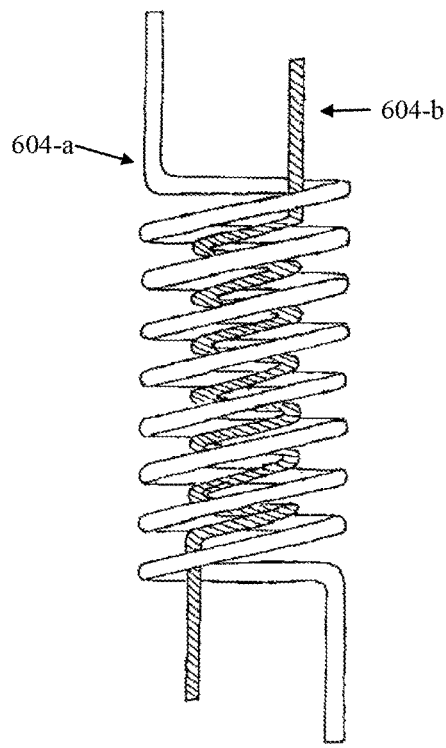
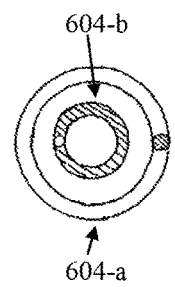
FIG. 6a
FIG. 6b
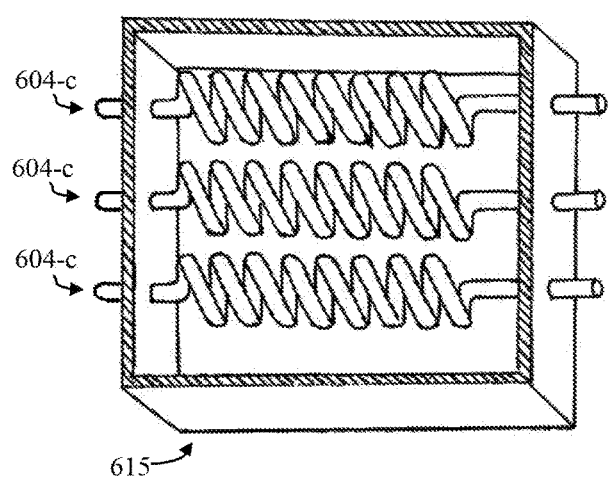
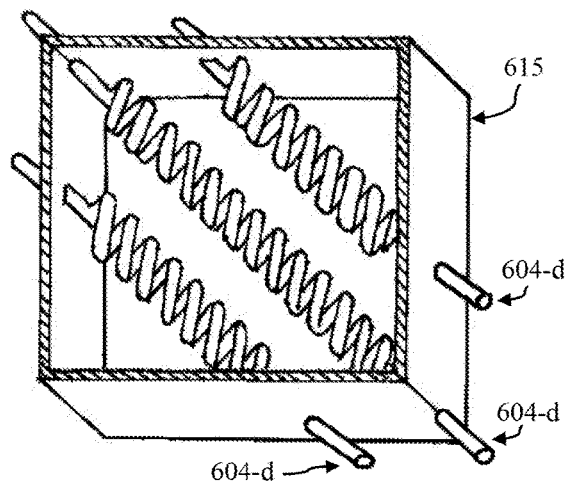
FIG. 6c
FIG. 6d

SYSTEMS AND METHODS FOR COLLECTING, STORING, AND USING ELECTRICAL ENERGY FROM THE EARTH MAGNETIC FIELD

CROSS-REFERENCE TO RELATED APPLICATIONS

This application is a continuation-in-part of and claims the benefit of U.S. Non-Provisional application Ser. No. 15/457,947, filed Mar. 13, 2017, which claimed the benefit of U.S. Non-Provisional application Ser. No. 14/802,987, filed Jul. 17, 2015, which claimed the benefit of U.S. Provisional Application No. 61/999,191, filed Jul. 17, 2014, and U.S. Provisional Application No. 62/070,211, filed Aug. 19, 2014, which are hereby incorporated by reference, to the extent that they are not conflicting with the present application.

BACKGROUND OF THE INVENTION

1. Field of the Invention

The invention relates generally to technologies based on the Earth magnetic field and more particularly to methods and systems for using the Earth's magnetic field as a source of energy for powering electric vehicles or other devices.

2. Description of the Related Art

With growing demand for renewable energy, many consumers are choosing hybrid or electric vehicles. However, there are many obstacles to overcome for electric cars to become practical for widespread use. Many consumers are concerned with the range they are able to drive before requiring time-consuming charging, and much of today's infrastructure would have to be changed to alleviate this problem. Also, since the electricity is often generated initially through fossil fuels, electric vehicles are not using a truly renewable resource for power. There is still a need for a renewable resource to aid with powering vehicles and at least reduce the frequent and time-consuming charging.

It is known in the prior art that moving a conductive coil of wire through a magnetic field can produce an electrical current in the wire. The direction of the current through the wire is dependent on the relative direction of motion between the coil of wire and the magnetic field, and the voltage V generated by a wire of length/moving through a magnetic field B at velocity v is given by the equation:

$$V = B \times l \times v$$

As it will be described in detail hereinafter, this concept may be used in the generation of an electrical current for use to power or to supplement the power of an electrical motor, such as, for example, electrical motor(s) in an electrical or hybrid vehicle, and thus address the need for a renewable resource.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one aspect, this invention may have as its objective the ability to generate electricity from the Earth's magnetic field while in motion to supply power to energy storing devices, such as supercapacitors, for example, as means for powering or at least supplementing the power of an electrical motor, such as, for example, electrical motor(s) in an electrical or hybrid vehicle, and thus address the need for a renewable resource.

Using the principle described by the equation above, the voltage from the wire may be supplied into a plurality of energy storing devices, such as supercapacitors. As the vehicle travels, the wires may be moved through the Earth's magnetic field, and may charge the supercapacitors, which may discharge to a motor. The wire may be made from copper or any other conductive material.

In one exemplary embodiment, a system of wires arranged in any configuration deemed suitable supplying power to supercapacitors discharging to a motor in a vehicle is provided. The supercapacitors may be connected to both the wires which supply the electrical current generated by the Earth's magnetic field, and to the vehicle's motor through a computer interface bus. Thus, by providing a supplemental source of energy, an advantage is that the use of the system at minimum decreases the frequency of the need for the vehicle to be recharged or for the purchase of gasoline or electricity by the user. Another advantage is the overall decrease in the use of electricity generated by fossil fuels.

In another embodiment, a system is provided for retrofitting existing electric vehicles with wires to produce an electrical current from the Earth's magnetic field, that can at least supplement the other power sources of the vehicle, such as a battery or an internal combustion engine. A vehicle may also, for example, be constructed with the system built in.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which:

FIG. 2b illustrates the connection of the voltmeter to the supercapacitor, by closing switches 2-S3 and 2-S4, as shown in FIG. 2a.

FIG. 3b illustrates the connection of the wattmeter, motor, and supercapacitor, by closing switches 3-S5 and 3-S6, as shown in FIG. 3a.

FIG. 5a illustrates the top view of an exemplary circular arrangement of wires.

FIGS. 5b-c illustrate the side views of two exemplary arrangements of FIG. 5a.

FIGS. 6a-d illustrate an exemplary nested coils arrangement of wires.

DETAILED DESCRIPTION OF THE PREFERRED EMBODIMENTS

Figure 1:
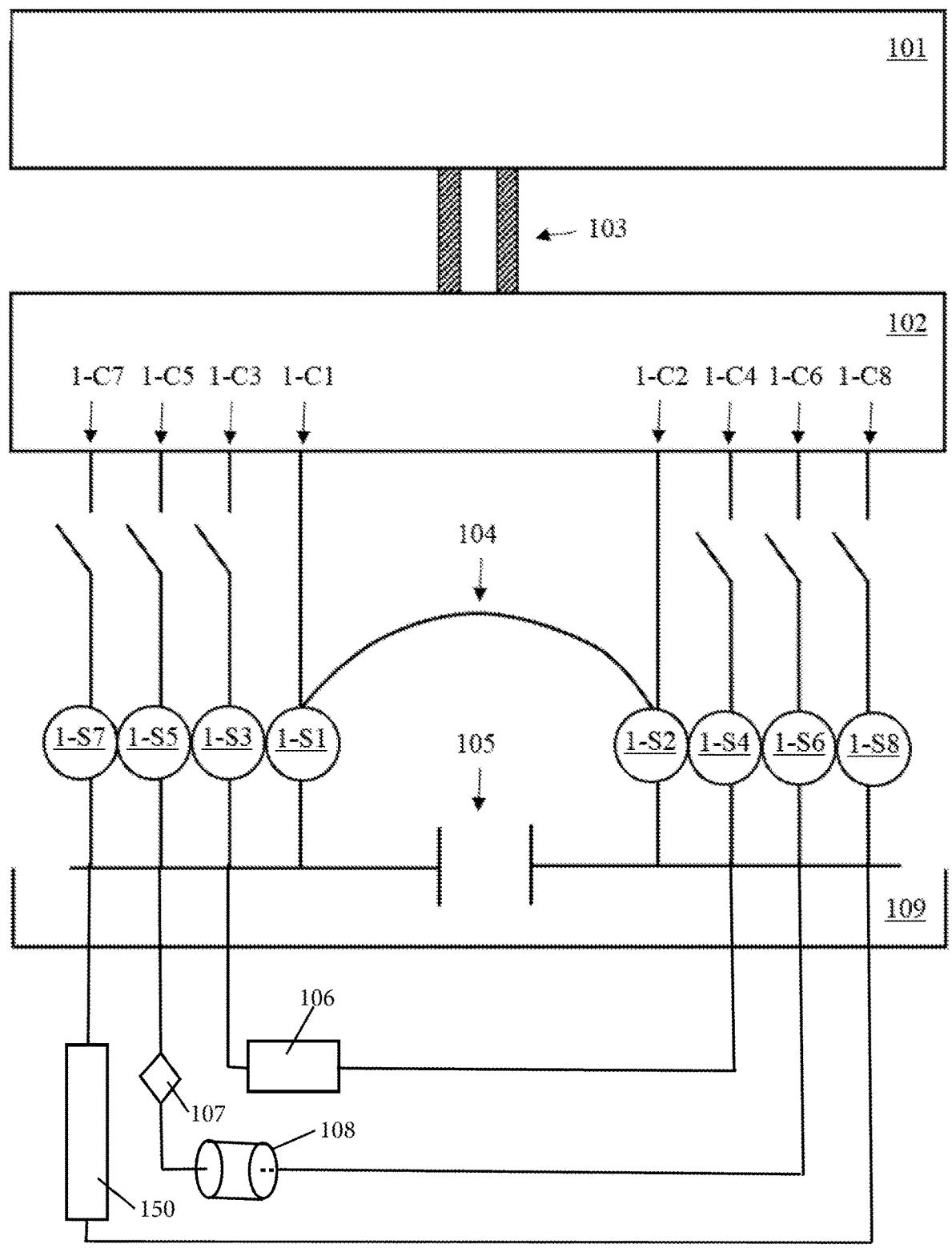
FIG. 1 illustrates an energy generation system controlled by a computer and comprising a wire, voltmeter, wattmeter, vehicle motor, supercapacitor, and computer interface bus, with switches configured to charge the supercapacitor, according to an embodiment.

What follows is a detailed description of the preferred embodiments of the invention in which the invention may be practiced. Reference will be made to the attached drawings, and the information included in the drawings is part of this detailed description. The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

FIG. 1 illustrates an energy generation system controlled by a computer according to an exemplary embodiment, which may include as shown a wire 104, positive and negative connections 1-C1 and 1-C2 to a supercapacitor 105, positive and negative connections 1-C3 and 1-C4 to a voltmeter 106, positive and negative connections 1-C5 and 1-C6 to a wattmeter 107 and motor 108 (e.g., electric motor, linear induction motor, etc.), positive and negative connections 1-C7 and 1-C8 to a battery 150, all connected via a computer interface bus 102 and a bus bar 109. The bus bar 109 may be two separate wires, one wire that allows one side of computer controlled switches, S1, S3, S5, S7, connect to the positive side of supercapacitor 105, and another wire that allows one side of computer controlled switches S2, S4, S6, S8 connect to ground. Information from the computer interface bus 102 may be sent to a computer 101 by wires 103 or any other suitable means. The connections to the interface bus 102 can be made by closing switches 1-S1-1-S8, thereby connecting the circuits, and the opening and closing of the switches may be controlled by the computer 101. When switches 1-S1 and 1-S2 are closed as shown in FIG. 1, the wire 104 is connected to the supercapacitor 105. The wire 104 is then able to charge the supercapacitor 105 as it will be described hereinafter. According to an embodiment, as it will be described in detail hereinafter, at any given time, there may be at least one wire 104 in a suitable position relative to the lines of flux of the Earth's magnetic field in order to generate voltage. The generated voltage can be calculated using the following equation:

$$V = B \times l \times v$$

where V is the voltage generated in volts, B is the Earth's magnetic field, using $3 \times 10^{-5}$ Tesla (T) as an example, as the strength may vary, l is the length of the wire, and v is the velocity of the wire.

One or a plurality of energy modules depicted in FIG. 1 may be provided for any given application as necessary to for example supply the necessary energy amount for the respective application.

Figure 2A:
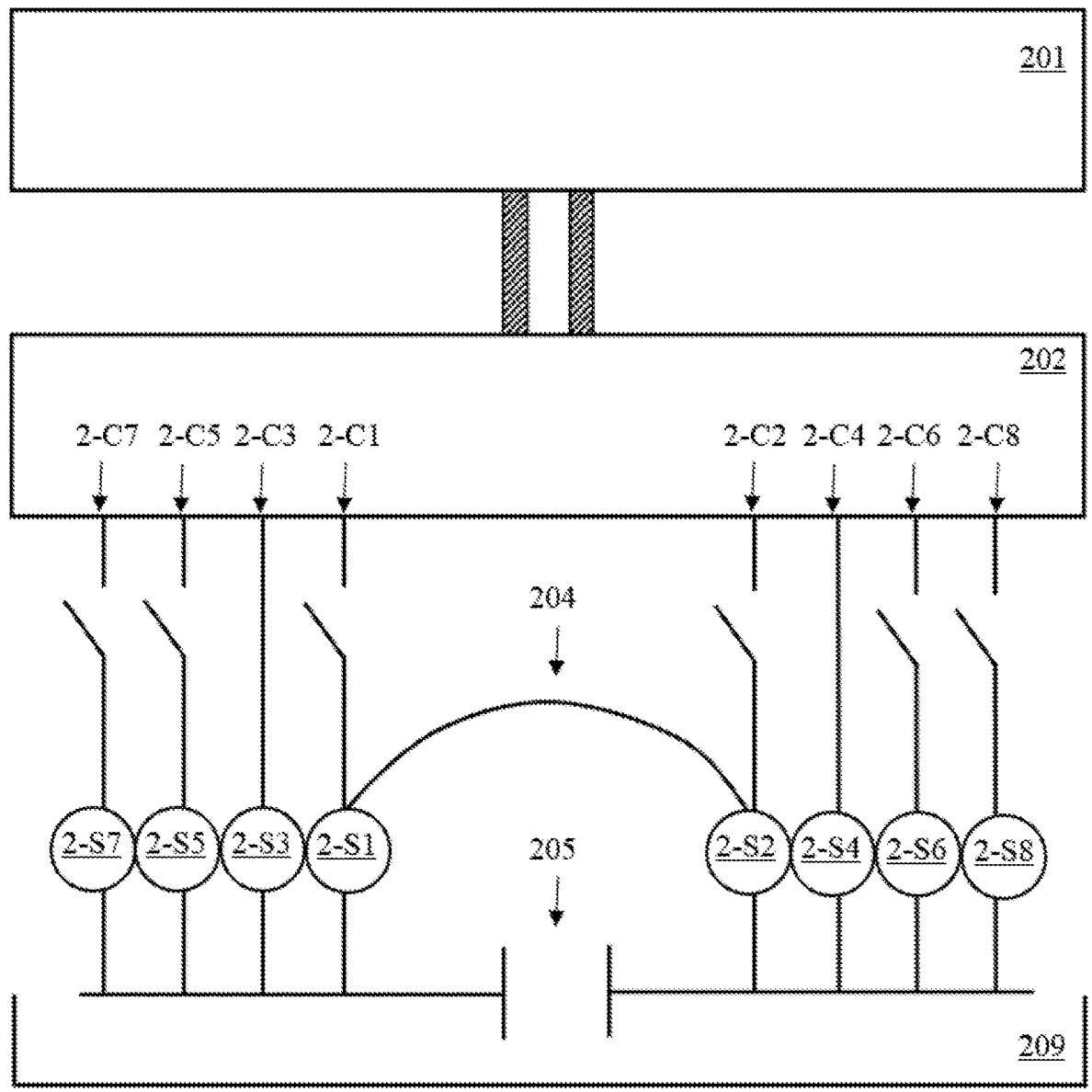
FIG. 2a illustrates the energy generation system of FIG. 1, with switches configured to connect the voltmeter across the supercapacitor.

Switches 1-S1 and 1-S2 may be opened certain times. As an example, switches 2-S1 and 2-S2 may be opened after 100 milliseconds (ms) of charging the supercapacitor 105, which disconnects the charging, and switches 2-S3 and 2-S4 may then be closed (see FIGS. 2a-b) to connect the voltmeter 106, 206 across the supercapacitor 105, 205, through the interface bus 102, 202. The voltage may then be read by the computer 101, 201, which then can use the information to calculate the energy stored in the supercapacitor 205 by the following equation:

$$E = \frac{CV^2}{2}$$

where E is the energy in joules (J), c is the capacitance in farads (F), and V is the voltage in the supercapacitor 205 in volts (V).

Figure 3A:
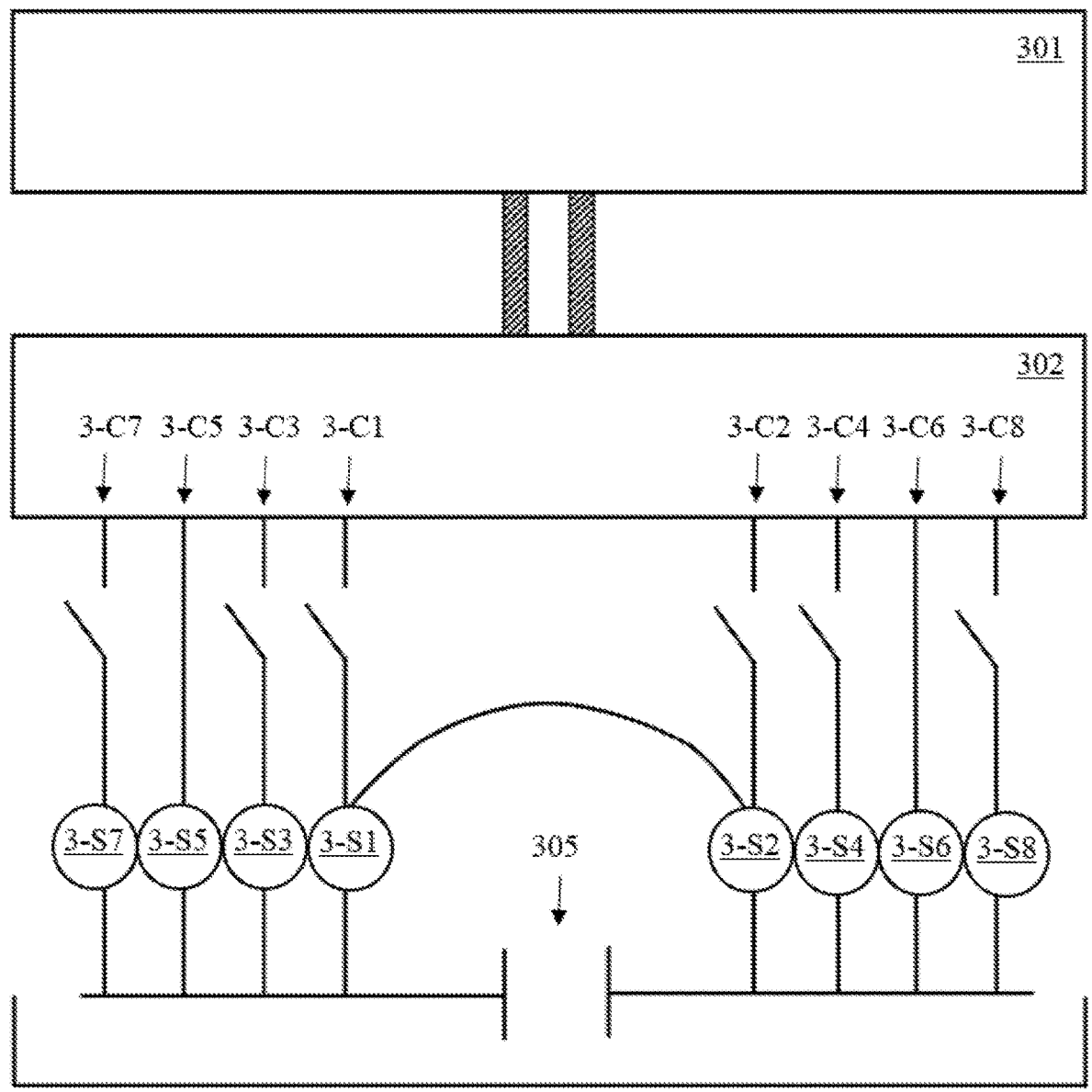
FIG. 3a illustrates the energy generation system of FIG. 1, with switches configured to connect the wattmeter across the motor.
Figure 3B:
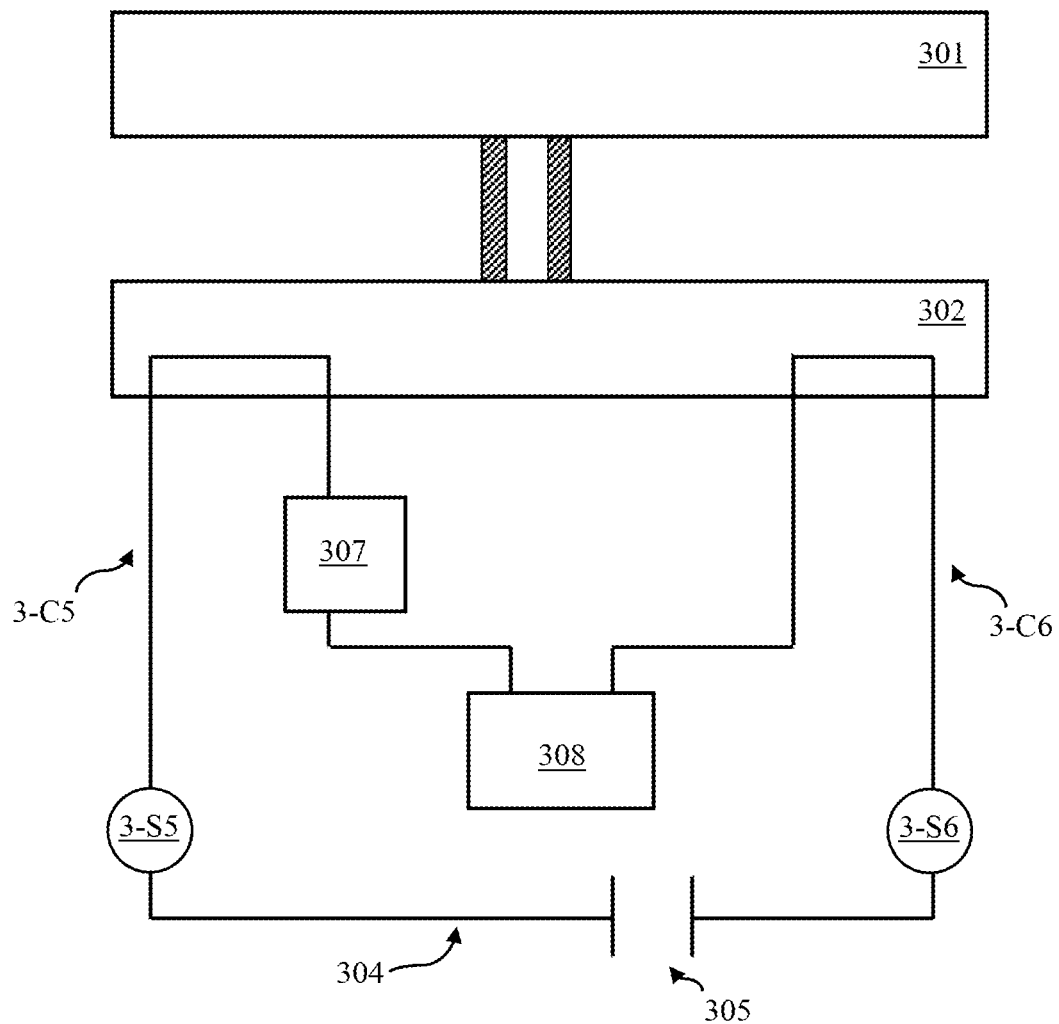

After some time (again, as an example, after 100 ms), switches S3 and S4 are then opened again and S1 and S2 are again closed (FIG. 1), such that the supercapacitor 105 can resume charging. When appropriate level of energy is detected in the supercapacitor 205, switches 3-S1 and 3-S2 may be opened and switches 3-S5 and 3-S6 may be closed (FIG. 3a), allowing the supercapacitor 305 to supply energy to the vehicle's motor 308 through circuits 3-C5 and 3-C6. As an example, such level of energy may be approximately 5,000 joules, which is when the voltmeter 106 reads approximately 0.99 volts (e=(c×v×v)/2 or e=(10000×0.99× 0.99)/2=about 5000 joules).

An algorithm may be provided for the computer 101 to determine when to switch one supercapacitor 105 out for another, for example when only a small amount of energy is left in the supercapacitor 105 currently supplying power to the motor 108, 308. For example, when the energy in a first supercapacitor 105, 305 falls to the amount of energy needed for two more seconds of use, to power the motor, or to a predetermined minimum energy level (e.g., about 50 joules, which is when the voltmeter 106 reads about 0.1 volts; e=(c×v×v)/2 ore=(10000×0.1×0.1)/2=about 50 joules), a first set of switches associated with the first supercapacitor, namely 1-S5 and 1-S6 may be opened and 1-S1 and 1-S2 may be closed to resume charging. In the same time, a second charged supercapacitor 105, 305 may be connected to the motor 108, 308 by opening a second set of 1-S1 and 1-S2 switches, and closing a second set of 1-S5 and 1-S6 switches. Thus, according to this exemplary algorithm, the computer 101 can determine which and/or in what order the supercapacitors 105, 305 should be discharged to the motor 108, 308, battery 150 (when for example the motor 308 receives enough power from other super capacitors), and/or computer 101 itself, the time of discharge and which supercapacitors 105, 305 should be charged. Thus, it should be noted that a plurality of supercapacitors 105 may be used in the same energy module from FIG. 1 to be charged by wire(s) 104, so that for example continuous power is provided to the motor.

Figure 2B:
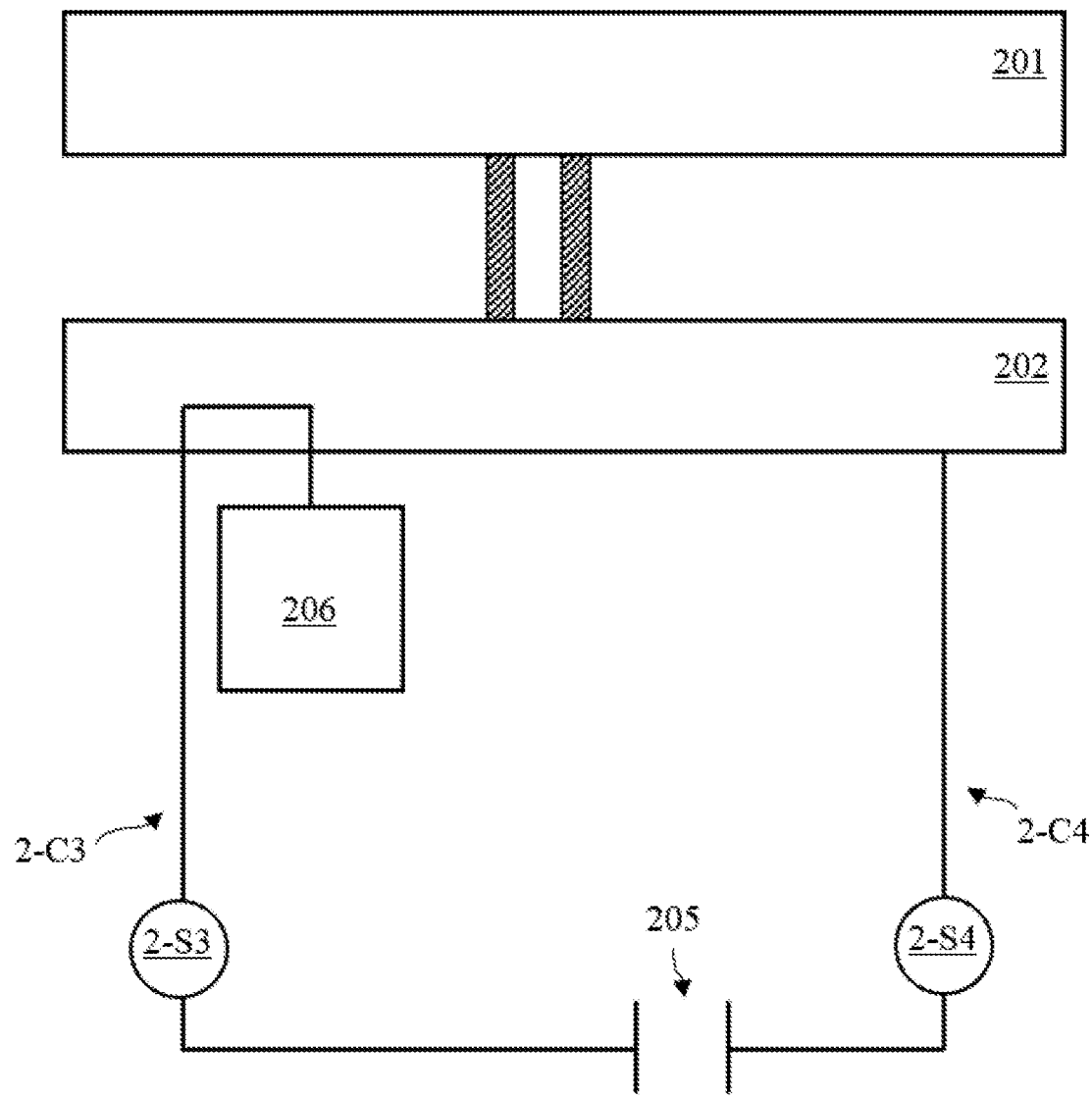
Figure 4:
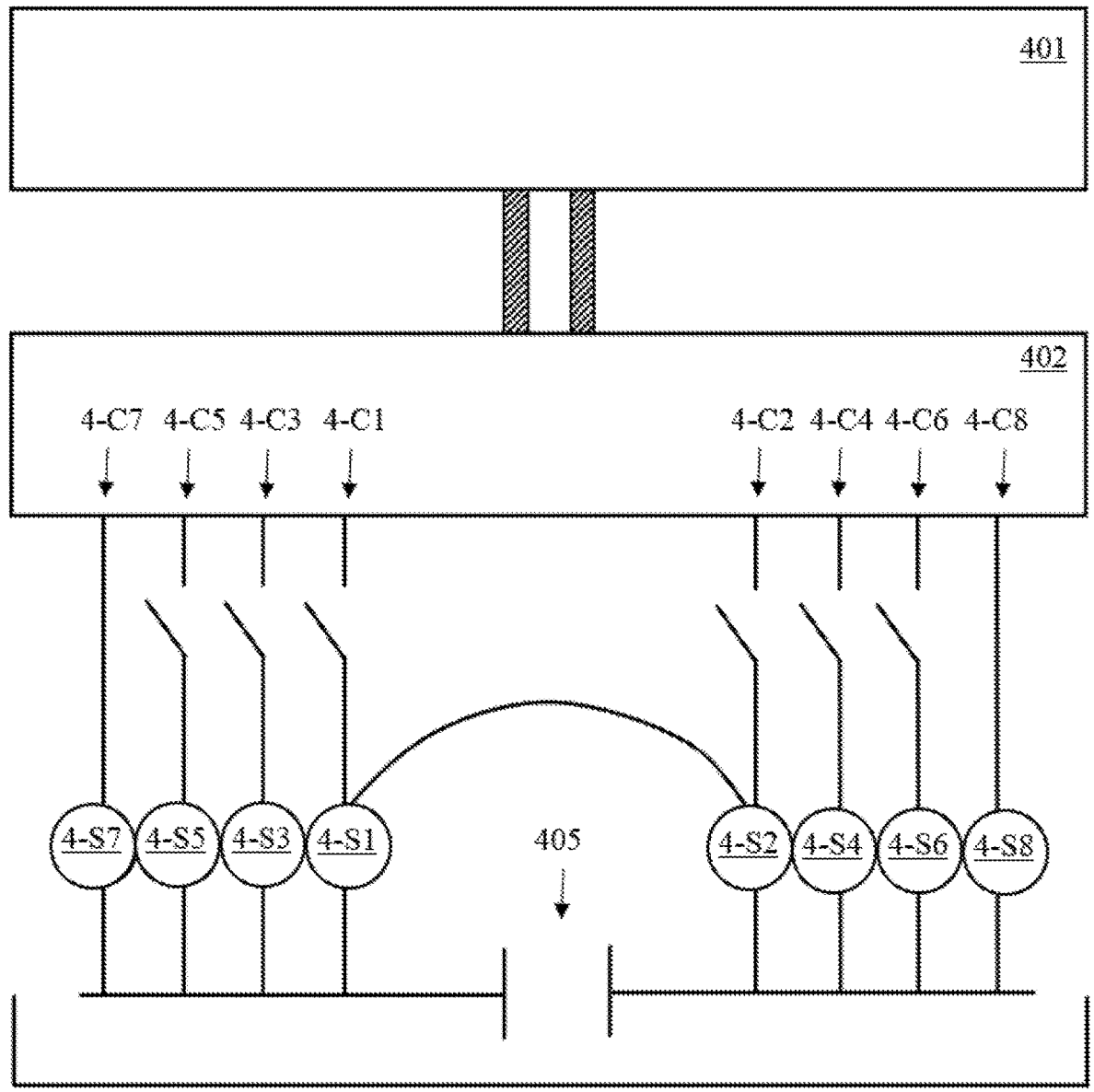
FIG. 4 illustrates the energy generation system of FIG. 1, with switches configured to charge a backup battery.

FIG. 4 illustrates the computer assembly of FIG. 1, with switches configured to charge or use the backup battery 150. Switches 4-S7 and 4-S8 may be closed when for example the vehicle is off, so that a battery connected by circuits 4-C7 and 4-C8 can be used to charge the supercapacitor 405 before starting the vehicle. If at any time the vehicle does not have enough power left in the supercapacitors 405, the back-up battery can be used to provide the missing power. As an example, a vehicle may be initially started by using power from the supercapacitors having stored energy, or may be started by using power from a back-up battery. The battery may be charged by either the supercapacitors 405 or an AC charger (not shown). For example, while the supercapacitor 105, 405 is charged by the battery 150, the computer 401 may check the voltage of the supercapacitor 405 by connecting the voltmeter as shown in FIG. 2b, and determine when the supercapacitor 405 is fully charged. The computer 101 may perform this by opening switches 4-S7 and 4-S8 and closing switches 4-S3 and 4-S4 for voltage readings at designated intervals of time (for example, 100 ms) until the supercapacitor 405 is fully charged. The computer 401 may continue this monitoring process while the vehicle is in motion, to determine how many joules of energy is needed by measuring the voltage and the current going to the motor 108, by monitoring the wattmeter 307. As an example, when the computer knows the velocity of the vehicle is 15.1 m/s, 1000 meters of wire is used, b=3.3 10 to minus 5, then voltage=0.5 volts. As an example, when a Chevy Volt™ travels 33.8 miles at 33.8 miles per hr, every 2.7 miles that the Chevy Volt™ travels it uses 1 kilowatt of energy. Thus, in 33.8 miles the Chevy Volt™ uses 12.5 kilowatts of energy. In this example, the computer 101 may need to make sure that the Chevy Volt™ has 12500 joules of every second at 15.1 m/s It should be noted that the computer 101 may include a processor (not shown), a memory (not shown) and the logic (software and/or hardware) necessary to implement the algorithms and processes described herein.

FIG. 5a illustrates the top view of an exemplary radial arrangement of a plurality of wires 504 (104 in FIG. 1) inside a cylinder 510. An advantage of the arrangement is that it allows there to be wires available at a suitable position relative to the lines of flux of the Earth's magnetic field at any given time. FIGS. 5b-c illustrate the side views of two exemplary arrangements of the wires 504 from FIG. 5a inside the cylinder 510. Only four wires 504, each bisecting the cylinder 510, are shown in FIG. 5a for clarity. However, a large plurality of wires 504, preferably as many as technically possible, may be placed inside of the cylinder 510, which (the cylinder) may be of any material that will not interfere with the Earth's magnetic field. Each of the wires 504 may extend out of the cylinder 510, without electrical contact with the cylinder 510 through holes 512 at both ends, and connect to the computer interface bus 109.

As shown in FIGS. 5b-c, where only a single wire is shown in each figure for clarity, the wires 504 may be folded such that a long length of wire can be fitted into a small space in a cylinder 510. For example, a 305 m. (meter) wire can be folded as shown in either FIG. 5b or FIG. 5c so that it measures 2 m. across the diameter of the cylinder 510. Each wire 504 should preferably be folded such that an unfolded wire loop 511 remains flat with no other folds on top of it, at the center of the cylinder 510. This would allow for other wires 504 of the same folded configuration to lay across the diameter of the cylinder 510, each crossing all other wires without electrical contact among them, at the wire loop 511, as shown in the top view in FIG. 5a.

As an example, a set of copper wires 504 of a standard 2 AWG gauge may be used in the arrangement illustrated in FIGS. 5a-c in order to generate electrical power by harvesting energy from the Earth' magnetic field. Energy at an exemplary rate of 40 J/s may be provided to the motor 108, as shown by the following equations and calculations.

A standard round 2 AWG wire has a diameter of 0.654 centimeters (cm). Calculations can be made for an exemplary cylinder with a height of 1 meter (m) and a diameter of 2 m (200 cm), with a slightly larger actual cylinder diameter used to accommodate the unfolded wire loop 511 and the space needed between the wires in the folds so that they do not have electrical contact. The number of times a 2 AWG wire could be folded vertically across that cylinder is 200 cm/0.654 cm=305.8, approximately 305 times. The height 1 m×305 folds gives a total length of 305 m of wire. Using the following equation $$V = B \times l \times v$$

B=3×10$^{-5}$ T (an example within the range of the strength of the Earth's magnetic field at the Earth's surface), l=305 m, and v is an assumed velocity of the vehicle of 33.3 meters/second, so V=0.305 volts are obtained from one wire 504.

Since the wires 504 are copper, the resistivity p of the material is known, and calculated to be 0.5217 ohms (Ω) per 1000 m of 2 AWG copper wire using the equation $$R = \rho \cdot \frac{l}{A}$$

where R is the resistance in ohms, l is the length of the wire in m and A is the cross-sectional area of the wire in m$^2$. To calculate the resistance for the 305 m wire, (0.5217/1000)·305=0.159 Using this resistance, the power can be calculated with the equation $$P = \frac{V^2}{R}$$

where V$^2$ is (0.305)$^2$=0.093. Therefore 0.093/0.159=0.585 J/s is the rate at which power can be delivered from or to the supercapacitor 105 while charging, respectively, from a single wire.

The energy stored in a 10,000 F supercapacitor, which may be used as an example, is calculated with the equation $$E = \frac{CV^2}{2}$$

where V$^2$ is (0.305)$^2$=0.093. 0.093×10,000 farads/2=465 joules of energy in one supercapacitor.

A supercapacitor can supply a constant rate of power for a time t, in seconds (s), given by the equation $$t = [c \cdot (V_{charge}^2 - V_{min}^2)]/(2 \cdot p)$$

where $V_{charge}$ is 0.305 V as calculated above, and $V_{min}$ is a desired 0.1 V remaining in the supercapacitor for optimum performance, and p is the desired rate of power to the motor of 40 J/s. $V_{charge}^2$ is (0.305)$^2$=0.093 and $V_{min}$ is (0.1)$^2$=0.01. t is [10,000·(0.093−0.01)]/2·40=10.375 s of power by one wire. With 152 wires, 152·10.375=1577 s, or approximately 26.2 minutes. Alongside this, the time it takes to charge one supercapacitor is 465 joules/0.585=794.9 s, or approximately 13.2 minutes. With the rate of charge being approximately half of the time it takes to discharge all supercapacitors to 0.1 V, the vehicle may be provided with supplemental power of 40 J/s at this exemplary velocity. For any rate of power needed by the motor, using the equation above, the amount of time the supercapacitor can deliver power to the motor can be calculated. The computer 301 may be controlling the order in which the supercapacitors 305 will connect to the wire 304 to charge, then connect to the motor 308 to discharge and provide power, and reconnect to the wire to recharge, as described hereinbefore.

In another embodiment, a larger number of wires may be used, or a number of smaller sets of wires can be used to equal one larger plurality of wires. More wires may also be used in order to supply more power if needed, and more wires may also be used to supply power also to other parts of the vehicle, such as the lights, radio, or other components. In an embodiment, each wire 104, 504 may connect via the interface bus 109 to an individual supercapacitor 105.

FIGS. 6a-d illustrate an exemplary nested coils arrangement of wires with no electrical contact. FIG. 6a-b illustrate the side and top views of two coiled wires 604-a and 604-b, with wire 604-b nested inside of wire 604-a. Only two wires are shown for clarity, but more wires may be used. FIG. 6c shows three wire coils 604-c pointed in a direction parallel to the path of the vehicle, which preferably each have additional coiled wires nested inside as shown in FIGS. 6a-6b. FIG. 6d shows three wire coils 604-d pointed at an angle relative to wire coils 604-c. Only three sets of wire coils 604-c and 604-d are shown in each box 615 for clarity, though more or less may be used. Arranging the boxes with the wire coils 604-c and 604-d as shown in FIG. 6c d allows there to be wires available at the correct position relative to the lines of flux of the Earth's magnetic field at any given time. As an example, wire coils 604-c in a box as shown in FIG. 6c may be positioned such that the wire coils 604-c are perpendicular to the ground, and may generate electricity as the vehicle travels in an east or west direction by cutting the lines of magnetic flux. As the vehicle changes direction to travel, north, south, north-east, north-west and so on, wire coils shown in FIG. 6d may be positioned at a horizontal angle with respect to the longitudinal axis of a car for example, preferably at a 45-degree angle, so that they continue to generate electricity by cutting the lines of the Earth's magnetic flux. So, in an embodiment, a set of wires may be placed at the 45-degree angle and other set at an opposite 45-degree angle relative to the longitudinal axis of the car (e.g., simulating the two rooftop diagonals), to ensure that irrespective of the direction of travel, at least one set of wires is cutting the lines of the Earth's magnetic flux and thus collect energy.

As an example, to achieve a rate of supplemental power supplied to the vehicle motor of 40 J15, a system of nested coils may be used, as shown in FIG. 6a-6d. For example, three boxes 615 of four sets of nested wire coils, each set having four coils for a total of 48 coiled wires may be used for supplying electric current to 48 supercapacitors. Each wire (such as 604-a and 604-b shown in FIG. 6a-6b) for the purposes of this example may be a 0000 AWG copper wire having a wire diameter of 11.684 millimeters (mm). The resistivity of the material is known, and calculated to be 0.16072Ω per 1000 m using the equation $$R = \rho \cdot \frac{l}{A}$$

where l is the length of one coiled wire in m. To find the length, first a coil diameter of 1 m is used. The circumference of one such coil is $2\pi r = 3.1416$ m. In one meter length, a wire of 0000 AWG diameter width could fit approximately 85 times (1000 mm/11.684 mm=85.6). Therefore, it takes 3.1416×85=267 m of wire to make 85 coils in a 1 m length of space.

Since 1 V derived from a single wire is desired, a longer length of wire is needed for this example. When 1000 m of wire is used to make coils of the dimensions described above, approximately 1000/267=3.75 m length of space is required to accommodate the coil, and the equation $$V = B \times l \times v$$

can be used to find the amount of voltage generated from this wire. Using the same assumed variables as described above for the circular arrangement of wires, $(3 \times 10^{-5}$ T$) \times (1000$ m$) \times (33.3$ m/s$) = 1$ V for a single wire. Since 1 V is generated from 1000 m of wire, and the resistivity is 0.16072Ω per 1000 m at this length, the power generated is $$P = \frac{V^2}{R}$$

$(1)^2/0.16072=6.22$ J/s. This is the rate at which power can be delivered from or to the supercapacitor while discharging or charging, respectively.

The amount of energy stored in a supercapacitor is found using the equation $$E = \frac{CV^2}{2}$$

where the supercapacitor has a capacitance of 10,000 farads. $[(10,000) \times (1)^2]/2 = 5,000$ J. The amount of time that a supercapacitor can provide a constant output of power is given by $$t = [c \cdot (V_{charge}^2 - V_{min}^2)]/(2 \cdot p)$$

where, again as was described above, $V_{min}$ is 0.1 volts left in the supercapacitor for optimum performance and $V_{charge}$ is 1. $[10,000 \cdot (1-0.01)]/2 \cdot 40 = 123.75$ s, or approximately 2.06 minutes, is therefore the duration of time that a supercapacitor can provide a constant output of power from one wire.

The second coil 604-b, also a 0000 AWG wire, inside of the first coil 604-a may preferably have a smaller diameter of coils in order to fit inside, as shown as an example in FIG. 6a-b. Four coils of similar length are therefore used as a set in this example, each coil nesting inside of another with the smallest diameter of coil as the innermost wire.

With a coil diameter of 0.92 m, the second wire 604-b can nest inside of the first wire 604-a and the circumference of one coil of the second wire 604-b is $(0.92 \times \pi) = 2.89$ m. Using the same equations outlined above, the same amount of power 6.22 J/s can be provided, for 123.75 seconds. With a set of four coils nested one inside of the other (see FIG. 6a), this amounts to 24.88 J for a duration of 495 s, or approximately 8.25 minutes of constant power output from one set. Approximately 20 J/s can be provided to the vehicle with this set, since 495/24.88=19.89. Because preferably more sets of coils may be used, three sets of coils may be provided to achieve over the needed 40 joules of per second (1485/18.66=79.6 joules).

The time for recharge of one supercapacitor 305 using one wire coil set 604-c or 604-d is 5000 joules/24.88=200.96 seconds, or approximately 3.36 minutes. Since this is under the 8.25 minutes of constant power from another set, the vehicle may be provided with supplemental power at this exemplary velocity of 33.3 m/s, with the computer 301 controlling the order in which the supercapacitors 305 will connect to the wire 304 to charge, then connect to the motor 308 to discharge and provide power, and reconnect to the wire 304 to recharge.

In other exemplary embodiments, the copper wire from the energy module (e.g., FIG. 1) and/or wire arrangements (e.g., FIGS. 5a-c) described herein may be replaced by iodine doped carbon nanotubes cables, which is known to exceed the specific electrical conductivity of metals. Iodine doped carbon nanotubes cables have a resistivity of 10 to the minus 7 ohms per meter. They can carry 10 to the 4 to 10 to the 5 amps per one squared centimeter.

Again, it is known that V=B×I×v, where V is the voltage generated in volts, B is the Earth's magnetic field, using $3.3 \times 10^{-5}$ Tesla (T) as an example, as the strength may vary, l is the length of the carbon nanotubes cables, and v is the velocity of the wire (doped carbon nanotubes cables).

If for example the velocity=30.3 meters/sec and l=200 meters, the voltage V=3.3×10 to minus 5×200×30.3=0.2 volts.

The resistance in 200 meters of carbon nanotube cable is 200×10 to the minus 7. As known, the power=(voltage× voltage)/resistance (P=V×V/R). Thus, the power that can be generated by 200 meters of carbon nanotube cable moving at 30.3 meters/sec within the Earth's magnetic field is P=0.2 volts×0.2 volts/(200 meters×10 to the minus 7 Ohms/ meter)=0.04/(2×10 to the minus 5)=2,000 (two thousand) joules/second or 2,000 watts.

At a voltage of 0.2 volts, knowing that resistance of iodine doped carbon nanotube cable is 10 to the minus 7 Ohms and that I=V/R, the current I is 0.2 volts/2×10 to minus 7 Ohms, or 10,000 amps. This means that the doped carbon nanotube cable should have a cross-sectional area of 1 (one) square centimeter (10,000 amps/(10,000 amps/sq. cm)=1 sq. cm).

Volume of 200 Meters of Carbon Nanotube Cable

The volume of 200 meters of nanotube cable can be calculated as follows: 200 meters=200×100=20000 cm; thus, the volume is 1 sq. cm×20000 cm=20,000 cubic cm.

Mass of 200 Meters of Carbon Nanotube Cable

It is known that the density of iodine doped carbon nanotubes cables is 0.33 g/cubic cm. Since density=mass/ volume, the mass of 200 m of carbon nanotube cable is 0.33 g×20000 cubic cm=6600 grams or about 14.5 pounds (since 1 pound=454 grams).

As stated hereinabove, the amount of energy stored in a supercapacitor is found using the equation $$E = \frac{CV^2}{2}$$

When the supercapacitor has for example a capacitance of 10,000 farads, the energy (E) that can be stored in the supercapacitor by 200 m of carbon nanotube cable is ((0.2× 0.2)×10000)/2=200 joules.

In another example, if 500 meters of carbon nanotube cable is used instead of 200 meters, similar calculations as above, based on same assumptions, can be performed to derive the following:

Voltage=3.3×10 to the minus 5×500 m×30.3 m/s=0.5 volts.

Resistance=500 m×10 to the minus 7 ohms/m=5×10 minus 5 ohms.

Current=0.5 volts/5×10 to minus 5 Ohms=1×10 to the power of 4 amps (A).

Area of cross-section of the carbon nanotube cable is 1 sq. cm (10,000 amps/(10,000 amps/sq. cm)=1 sq. cm).

Volume of 500 meter of the carbon nanotube cable is 50,000 cubic cm (volume=1 sq. cm×500×100=5×10 to 4 cubic cm).

Since again, density=mass/volume, and density=0.33 g/cubic cm and volume=5×10 to 4 cubic cm, mass=0.33×5 10 to 4=16500 grams. Since 454 grams=1 pound, mass=16500/454=36.3 pounds=36 pounds.

In another example, if fifteen carbon nanotube cables, each 500 meters long are used, they will have a total weight of 15×36=548 pounds.

Each carbon nanotube cable of 500 meters in length will charge a supercapacitor to 1,250 joules (this can be derived from similar calculations shown above when referring to the 200-meter cable). Again, the computer 101 every millisecond for example monitors the charge on each supercapacitor 105, as described herein.

In an example, the 500 meter carbon nanotube cables may be coiled in "circles" of about 3 meters long (circumference). This means that when the carbon nanotube cable cross-section is about one square centimeter as described hereinbefore, the coil will be about 1.66 meters long. A 1.66 meters long coil could fit for example on the top of a car. When more than one is needed, the carbon nanotube cables may be fitted/nested inside of each other, as exemplary shown in FIGS. 5 and 6, and still, the length of the nested coils may be close to the 1.66 meters length.

In an example, 1000 meters long iodine doped carbon nanotube moving at a velocity=30.3 m/s may be used. Since, B=3.3×10 to minus 5 and voltage=B×L×V, voltage=1 (one) volt. The resistance of 1000 meter of iodine doped carbon nanotube is 1000×1×10 to minus 7=1×10 to minus 4. The power is (v×v)/r. Since v=1 volt and r=1×10 to minus 4 ohms, the power=1/1×10 to minus 4=10,000 watts=10,000 joules/s=10 kW. The energy stored in a capacitor=(v×v×c)/2. Since v=1 volt and c=10000 farads, e=5000 joules. Thus, it would take ½ (half) of second to charge the capacitor (5000 J/10000 J/s=½ s).

The velocity of 30.3 m/s is the equivalent of 67.7 miles/hr. As an example, when Chevy Volt™ travels 67.7 miles at 67.7 miles/hr, it travels one hour and every 2.7 miles that it travels uses 1 kilowatt·hour (kWh) of power. That means 25 (67.7/2.7) kilowatt of power is used for an hour (i.e., 25 kWh).

Since one 1000 m iodine doped carbon nanotube can produce 10 kW of power as described above, for example, 8 wires each of 1000 meters can be used at the same time (e.g., coiled and nested as described above), which could produce potentially up to 80 kW of power. The oversizing (80 kW>25 kW) may be used to account for example for the fact that not all wires may collect energy at full potential at the same time, depending on for example on the direction of travel of the carbon nanotube wires. However, as described herein, the 45-degree wire arrangement (especially when two 45-degree sets of wires are used (e.g., simulating the two cross diagonals of the rooftop of a car)) may ensure that at least one set (i.e., 4 wires or 40 kW) intersect the Earth's magnetic field irrespective of the direction of travel. Further, even if the power supplied by the wires would not be constantly sufficient to power a vehicle or a motor alone, it should be appreciated that even supplementing existing power sources (e.g., existing batteries) is a significant benefit.

Each wire may charge a super capacitor as shown in the chart below.

| | | | | | supercapacitors | | | | | |
|---|---|---|---|---|---|---|---|---|---|---|
| | 200 | 400 | 600 | 800 | 1 sec | 1200 | 1400 | 1600 | 1800 | 2000 milliseconds |
| 1 | d | 200 | 400 | ch | ch | ch | ch | ch | | |
| 2 | ch | d | 200 | 400 | ch | ch | ch | ch | | |
| 3 | ch | | d | 200 | 400 | ch | ch | ch | | |
| 4 | ch | | | d | 200 | 400 | ch | ch | | |
| 5 | ch | | | | d | 200 | 400 | ch | | |
| 6 | ch | | | | | d | 200 | 400 | | |
| 7 | ch | | | | | | d | 200 | | |
| 8 | ch | | | | | | | d | | |

Again, at the stated speed, the Chevy Volt™ may discharge 5000 joules from a supercapacitor in 200 milliseconds (i.e., 25000 J/s) and it takes the supercapacitor 500 milliseconds (or half of second) to charge to 5000 joules.

In the chart above, "ch" means the supercapacitor is charged to 5000 joules; "d" means the supercapacitor is discharged; again, it takes 500 milliseconds to charge supercapacitor to 5000 joules. The chart is showing the times for charging and discharging the supercapacitors. For example, supercapacitor number 2, after being discharged at 400 milliseconds, it will be charged for 200 milliseconds at 600 milliseconds.

The volume of 1000 meter iodine doped nanotube in cubic cm is volume=1000×100 1 sq cm=1×10 to 5 cubic cm; since density=mass/volume and density=0.33 g/cubic cm, volume=1×10 to 5 cubic cm, mass=0.33×10 to 5 grams. Since, 454 grams=1 pound, mass in pounds is 0.33×10 to 5/454=73 pounds. 8 wires=73×8=584 pounds.

The current in 1000 meter wire is 10000 amps (I=v/r, v=1 volt, r=1000×1×10 to minus 7).

The above chart shows that 8 iodine doped carbon nanotubes cables of 1000 m each, may be enough to move or at least help move a Chevy Volt™ at 67.7 miles/hr.

In another example, 1000 meter iodine doped carbon nanotube cables may be used at a velocity=15.1 m/s=33.8 miles/hr. Since b=3.3×10 to minus 5, voltage=b×l×v, voltage=15.1×1000×3.3×10 to minus 5=0.5 volts. Since iodine doped carbon nanotubes have resistance of 1×10 to minus 7 ohms/meter, the resistance of 1000 meters is 1000×1×10 to minus 7=1×10 to minus 4 ohms; sine power=(v×v)/r, power=(0.5×0.5)/(1×10 to minus 4)=2.5×10 to minus 3=2500 watts=2500 joules/sec=2.5 kW; the energy (e) stored in a capacitor is e=(v×v×c)/2 ore=(0.5×0.5×10000)/2=1250 joules. If the Chevy Volt™ travels 33.8 miles at velocity of 33.8 m/hr, it travels for one hour and it uses 1 kilowatt hour (1 kWh) of energy for every 2.7 miles traveled; thus the number of kilowatts hour used for this travel is 33.8/2.7=12.5 kWh.

In an example, there are 8 wires (iodine doped carbon nanotube cables) each of 1000 meters may be used. Each wire may potentially produce as shown above (at 33.8 miles/hr) 2.5 kW. Thus, 8 wires could potentially produce a total of 20 kW. Again, the oversizing (20 kW>12.5 kW) may be used to account for example for the fact that not all wires may collect energy at full potential at the same time, depending on for example on the direction of travel of the carbon nanotube wires. However, as described herein, the 45-degree wire arrangement (especially when two 45-degree sets of wires are used (e.g., simulating the two cross diagonals of the rooftop of a car)) may ensure that at least one set (i.e., 4 wires or 10 kW) intersect the Earth's magnetic field irrespective of the direction of travel. Further, even if the power supplied by the wires would not be constantly sufficient to power a vehicle or a motor alone, it should be appreciated that even supplementing existing power sources (e.g., existing batteries) is a significant benefit.

Each wire charges a super capacitor to 1250 joules. The Chevy Volt™ discharges a super capacitor in 1250/12500=0.1 sec=100 milliseconds In the chart below, the top row is the time in 100 millisecond increments, the first column shows the supercapacitor number and the numbers inside the table are charging times in 100 milliseconds and implicitly the percentage of charge (i.e., 1=capacitor 20 percent charged, 2=capacitor 40 percent charged, 3=capacitor 60 percent charged, 4=capacitor 80 percent charged); d indicates that the capacitor is discharged; ch=indicates that the capacitor is charged.

| | 1 | 2 | 3 | 4 | 5 | 6 | 7 | 8 | 9 | 10 | 11 | 12 | 13 | 14 | 15 | 16 | 17 | 18 | 19 | 20 time in .1 sec |
|---|---|---|---|---|---|---|---|---|---|---|---|---|---|---|---|---|---|---|---|---|
| | | | | | | | | | | capacitors | | | | | | | | | | |
| 1 | d | 1 | 2 | 3 | 4 | ch | ch | d | 1 | 2 | 3 | 4 | ch | ch | | | | | | |
| 2 | ch | d | 1 | 2 | 3 | 4 | ch | ch | d | 1 | 2 | 3 | 4 | ch | | | | | | |
| 3 | ch | ch | d | 1 | 2 | 3 | 4 | ch | ch | d | 1 | 2 | 3 | 4 | | | | | | |
| 4 | ch | ch | ch | d | 1 | 2 | 3 | ch | ch | 1 | d | 1 | 2 | 3 | | | | | | |
| 5 | ch | ch | ch | ch | d | 1 | 2 | 3 | 4 | ch | ch | d | 1 | 2 | | | | | | |
| 6 | ch | ch | ch | ch | ch | d | 1 | 2 | 3 | 4 | ch | ch | d | 1 | | | | | | |
| 7 | ch | ch | ch | ch | ch | ch | d | 1 | 2 | 3 | 4 | ch | ch | d | | | | | | |

As shown, at the end of 0.1 sec capacitor number one (cl) is discharged, capacitors 2 to 7 are charged; at the end of 0.2 sec capacitor cl is 20 percent charged, capacitor 2 is discharged, capacitors 3 to 7 are charged; at the end of 0.3 sec capacitor 1 is 40 percent charged, capacitor 2 20 percent charged, capacitor 3 is discharged and capacitors 4 to 7 are charged; at the end of 0.4 sec capacitor 1 is 60 percent charged, capacitor 2 is 20 percent charged, capacitor 3 is 20 percent charged, capacitor 4 is discharged, and capacitors 5 to 7 charged, at the end of 0.5 sec. capacitor 1 is 80 percent charged, capacitor 2 is 60 percent charged, capacitor 3 is 40 percent charged, capacitor 4 is 20 percent charged, and capacitor 5 is discharged; at the end of 0.6 sec capacitor 1 is charged, capacitor 2 is 80 percent charged, capacitor 3 is 60 percent charged, capacitor 4 is 40 percent charged, capacitor 5 is 20 percent charged, capacitor 6 is discharged, and capacitor 7 is charged; at the end of 0.7 sec capacitor 1 is charged, capacitor 2 is charged, capacitor 3 is 80 percent charged, capacitor 4 is 60 percent charged, capacitor 5 is 40 percent charged, capacitor 6 is 20 percent charged and capacitor 7 is discharged Hence, as demonstrated above, as long as the Chevy Volt™ travels at 15.1 meters/sec=33.8 miles/hr, the 8, 1000 m iodine doped carbon nanotube wires may replace the battery as an energy source or at least supplement the battery.

Again, iodine doped carbon nanotube 1000 meters weighs 73 pounds; thus 7 wires each 1000 meters weigh 511 pounds.

In an example, the carbon nanotube cables may be fitted on the roof of a car preferably at a 45-degree horizontal angle with respect to the longitudinal axis of the car. In an example, this can be accomplished by placing the box with carbon nanotube cables shown in FIG. 6 flat on the top of the car, with the left side of the box facing the front of the car and the right side of the box facing the back of the car. This configuration may ensure that the carbon nanotube cables will intersect the Earth magnetic field irrespective of the direction of travel of the car, thus likely continuously collecting energy.

The carbon nanotube cables may be coated with an insulator (e.g., plastic) material that does not interfere with the Earth's magnetic field but prevents electrical contact between the carbon nanotube cables when for example they are coiled or nested together as described herein.

Figure 7A:
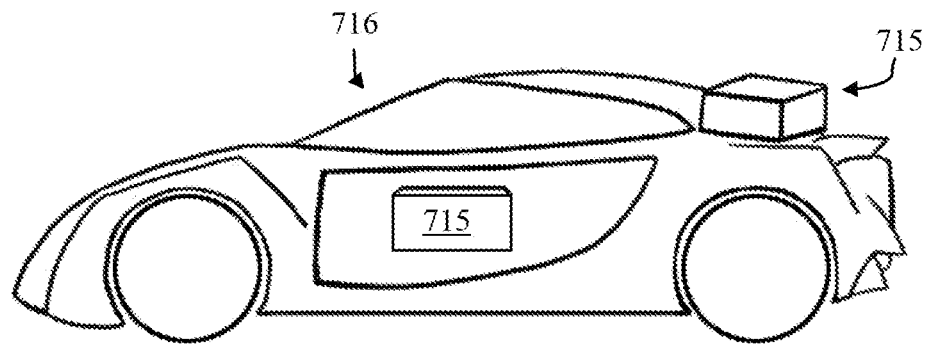
FIGS. 7a-b illustrate an example of retrofitting an electric vehicle with the nested coils system shown in FIGS. 6a-d.
Figure 7B:
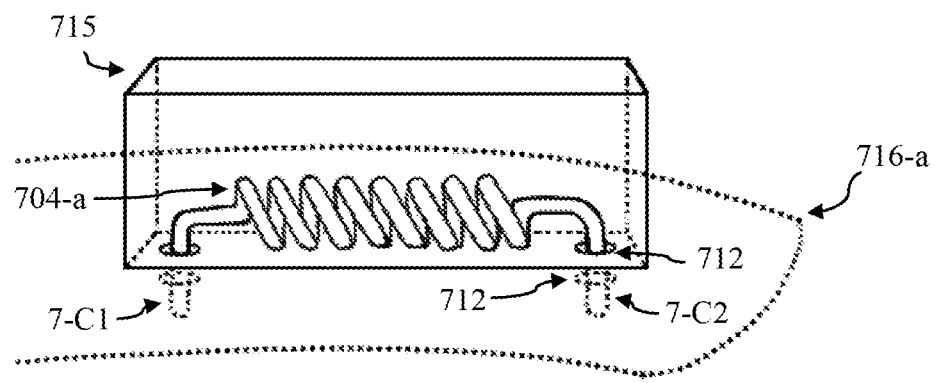

FIG. 7a illustrates a side view of an electric vehicle retrofitted with a system of nested coiled wires as in FIGS. 6a-d, according to an embodiment. An electric vehicle may be retrofitted with, for example, a circular arrangement of wires in a cylinder (FIGS. 5a-c), or a nested coiled wires arrangement in a box (FIGS. 6a-d) in order to provide power to the vehicle's motor. In one embodiment, a set of boxes 715 is placed in or on the vehicle (FIG. 7a). A plurality of coils, each preferably containing one or more coils nested inside, are placed in each box 715. FIG. 7b illustrates a wire 704-a which may be coiled and placed inside of a box 715 such that the box can be mounted anywhere on a vehicle. The wire 704-a may, for example, connect to a computer interface bus 102 via circuits 7-C1 and 7-C2. The computer interface bus 102 may be located in the interior of the vehicle, in which case the wire 704-a may reach the bus 102 by exiting the box 715 through holes 712 and 712-a of the box 715 and body of the vehicle 716-a, respectively.

Figure 7C:
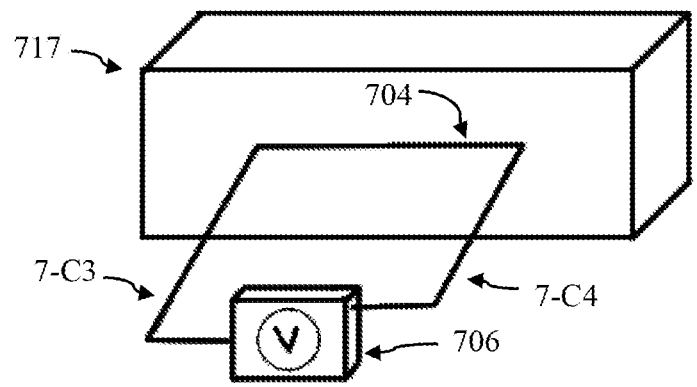
FIG. 7c shows an example of a wire connected to a voltmeter.

FIG. 7c shows an example of a wire 704 connected to a voltmeter 706. What follows is a succinct presentation of the experiments conducted to arrive at the systems and methods disclosed above. A vehicle was used to carry the wire 704 connected to a voltmeter 706 by circuits 7-C3 and 7-C4. The wire 704 and voltmeter 706 were attached to the vehicle by a wooden piece 717, which does not impede the Earth's magnetic field and provided insulation for the wire 704, protecting it from any interference from the vehicle. The experiment was performed on a small scale, driving the vehicle with only one wire 704 and taking readings from the voltmeter 706. The experiment showed that a voltage was collected by the wire 704. The collected voltage appeared to be sufficient to provide supplemental energy to an electric vehicle as disclosed above particularly if the number of wires were to be increased.

It should be understood that retrofitting a vehicle with the systems described herein and exemplarily shown in FIG. 7a-c may be performed in any manner deemed suitable, such as, for example, including a system attached via a trailer hitch to the vehicle, using a bicycle rack or other such similar devices to carry the system, or attaching the system onto the roof, doors, undercarriage, or interior of the vehicle using any suitable method. An electric vehicle may also be constructed with the system already built in, or the body of an electric vehicle may for example be constructed with other similar suitable technology such as, for example, integrated circuit technology, such that the body is made up of sheets of conductive material such as copper to allow the vehicle body to act as the copper wires. The sheets of copper may, for example, be etched in order for them to act as the wires as described in the system herein.

It should be understood that, the inventive aspects disclosed herein may be adapted for various applications, to supply or supplement power, for, for example, a space station, satellites, planes, drones, other aircraft, ships or missiles.

It should be further understood that the system disclosed herein may be able to use in a similar way, in addition to or as a replacement of the superconductor iodine doped carbon nanotubules, brand new superconductor materials such as metallic hydrogen, and other materials that are in development now and in the future.

Use of the system described herein for association with a space station or satellite may provide power or supplemental power to the space station or satellite. The power supplied may be similarly derived from the calculations described previously herein. In these examples, iodine doped carbon nanotubes may still be used, and a variable number of fibers ("fibers" or "wires") may be used. The iodine doped carbon nanotubes may have a resistance of 114 ohm, as is known in the art. The resistance when the number of iodine doped carbon nanotubes is increased is shown in the table below.

| Number of fibers | Resistance (ohms) |
| --- | --- |
| 1 | 114 |
| 2 | 57 |
| 4 | 28.5 |
| 8 | 14.25 |
| 16 | 7.12 |
| 32 | 3.56 |
| 64 | 1.78 |
| 128 | 0.89 |
| 256 | 0.44 |
| 512 | 0.22 |
| 1000 | 0.11 |
| 2000 | 0.055 |
| 4000 | 0.0275 |
| 8000 | 0.014 |
| 16,000 | 0.007 |
| 32,000 | 0.0037 |
| 64,000 | 0.0015 |
| 128,000 | 0.00015 |
| 256,000 | 0.000406 |
| 512,000 | 0.000203 |
| 1,000,000 | 0.000101 |
| 2,000,000 | 0.0000567 |
| 4,000,000 | 0.000025 |
| 8,000,000 | 0.0000125 |
| 16,000,000 | 0.0000063 |
| 32,000,000 | 0.0000031 |
| 64,000,000 | 0.0000015 |
| 128,000,000 | 0.0000007 |
| 256,000,000 | 0.0000004 |
| 512,000,000 | 0.0000002 |
| 1,000,000,000 | 0.0000001 |

Here, the magnetic field at approximately 300 km above the earth may be calculated as being $3 \times 10^{-8}$ and a velocity of 8,000 m/second may be used for the velocity of a space station in orbit. Using the equation above to find the length of wire required, if voltage is 3 volts, then $3=(3\times10^{-8})\times l \times (8,000)$, then $l=12,500$ m (or $1.25\times10^6$ cm) is calculated as the length of wire needed in total. As an example, each wire may be 200 m or 500 m in length. Next, c is given as $1\times10^6$ and again with the voltage given as 3 volts, e can be calculated as $(3\times3\times1\times10^6)/2=4.5\times10^6$ joules. The wires and the supercapacitors can thus provide power or supplemental power to the space station or satellite.

Other calculations used for this example may be carried out similarly to the example of using 1000 meter long carbon nanotubes for the Chevy Volt™.

Again as described herein, carbon nanotube cables may be coiled in "circles," which may have a radius of 3 meters as an example. Thus, the circumference of these circles can be calculated to be 18.85 meters. To show how many circles are needed to achieve the length calculated above, the following is calculated: $(12500)/(18.85)=675$.

The power is calculated by: $(3\times3)/(3\times10^{-4})=3\times10^4$ joules/second, according to the calculations and equations described herein. The time to charge a supercapacitor for one cable can be calculated by time=$(4.5\times10^6)/(3\times10^4)=1.5\times10^2$, or 1,500 seconds, or 1.5 hours. Because 24 hour/1.5 hour=16, one cable can charge 16 supercapacitors in one day. Each supercapacitor can hold as an example $4.5\times10^6$ joules. Ten cables can charge 160 supercapacitors. Every 1.5 hours, ten wires and supercapacitors may be capable of generating power or supplemental power, or sufficient power for a surplus, for the space station, which is known to be approximately $8\times10^4$ joules/sec to $12\times10^4$ joules/second. $12\times10^4$ joules/second may be accomplished by 4 cables, and thus, additional power may be generated by providing additional cables to the system. Similarly, power or supplemental power may be generated for a satellite.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A system for using the Earth's magnetic field to provide supplemental power to a machine having a motor, the system comprising:
   a computer;
   a plurality of wires at least partially contained within a cylinder; and
   a plurality of energy storing devices;
   the computer being electrically connected to the plurality of energy storing devices via the plurality of wires, and the computer being programmed to control the plurality of energy storing devices via the plurality of wires;
   wherein the plurality of wires can collect electrical energy from the Earth's magnetic field while the machine is put in motion by a power source powering the motor;
   wherein the collected electrical energy is stored in the plurality of energy storing devices or used to provide the supplemental power to the motor; and
   wherein each wire from the plurality of wires is folded and placed radially in the cylinder, such that to extend across a diameter of the cylinder, such that to achieve a maximum length for each of the plurality of wires, a maximum total length of the plurality of wires, and such that at least a wire of the plurality of wires has a correct position relative to the Earth's magnetic field lines of flux at any given time.

2. The system of claim 1, wherein the machine is an electric vehicle.

3. The system of claim 1, wherein the power source is a battery.

4. The system of claim 1, wherein the energy storing devices are supercapacitors.

5. The system of claim 1, wherein each wire from the plurality of wires is associated with a corresponding energy storing device from the plurality of energy storing devices.

6. The system of claim 1, wherein the plurality of wires is formed in a plurality of nested coils, wherein at least some of the nested coils are positioned at a 45-degree horizontal angle relative to a longitudinal axis of the electric vehicle.

7. The system of claim 1, wherein the plurality of wires is integral to the body of the electric vehicle.

* * * * *